(No Model.)
A. E. & W. E. FEROE.
PROCESS OF MANUFACTURING BEER, SIRUP, AND DISTILLED LIQUOR.
No. 282,619. Patented Aug. 7, 1883.
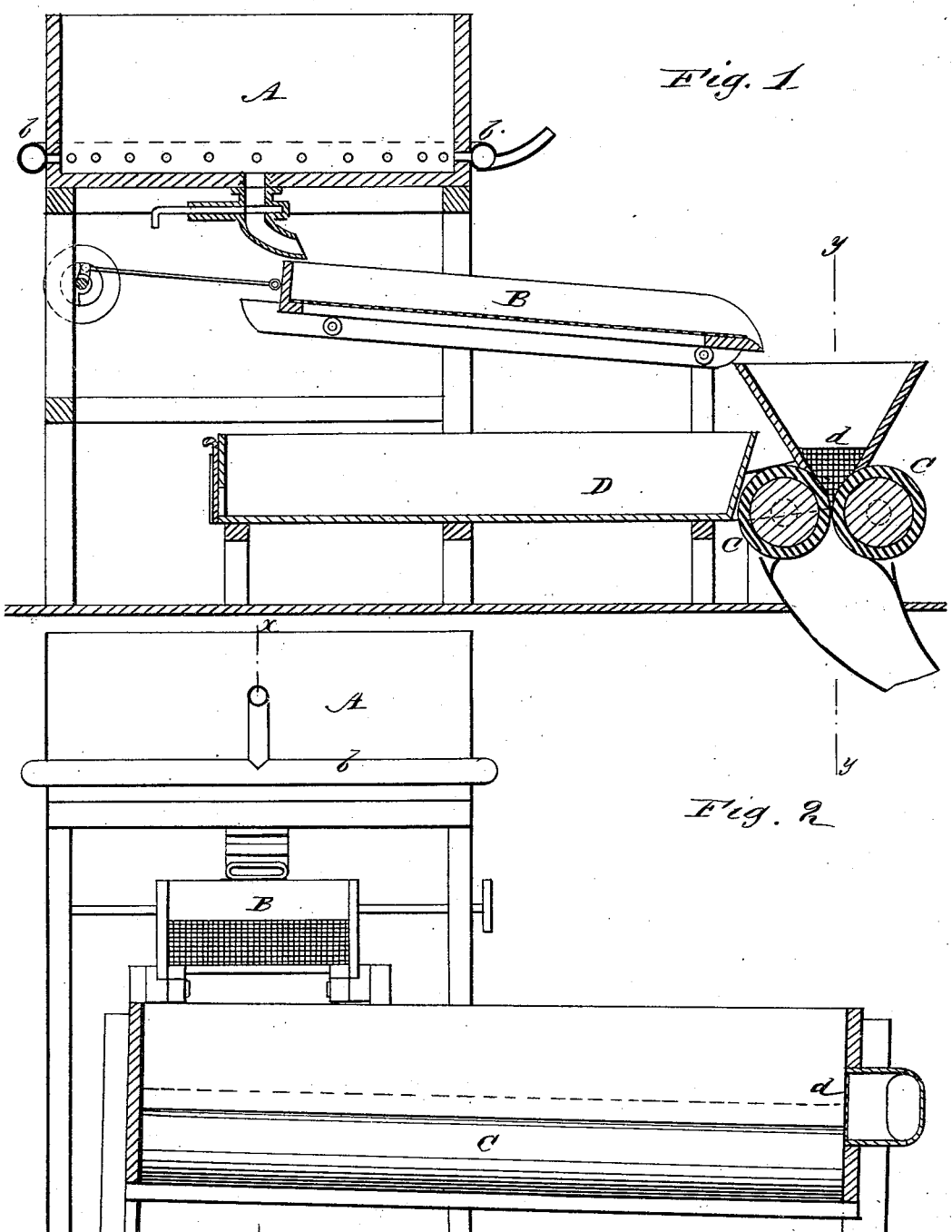

UNITED STATES PATENT OFFICE.

ALFRED E. FEROE, OF ALBANY, AND WILLIAM E. FEROE, OF POUGH-
KEEPSIE, NEW YORK.

PROCESS OF MANUFACTURING BEER, SIRUP, AND DISTILLED LIQUOR.

SPECIFICATION forming part of Letters Patent No. 282,619, dated August 7, 1883.

Application filed June 27, 1882. (No model.)

*To all whom it may concern:*

Be it known that we, ALFRED E. FEROE, of the city and county of Albany, and State of New York, and WILLIAM E. FEROE, of Poughkeepsie, in the county of Dutchess and State of New York, have invented new and useful Improvements in the Manufacture of Beer, Sirup, and Distilled Liquors, of which the following is a full, clear, and exact description.

This invention relates to the use of cornmeal in the manufacture of beer, sirup, and distilled liquors.

In all former processes known to us for using cornmeal in the manufacture of beer, sirup, and distilled liquors in which malt has been used for the purpose of converting the starch into saccharine several very serious difficulties have been encountered—viz., the extract has had a strong, raw, disagreeable flavor peculiar to corn, would not drain from the mash, and the yield, owing to the imperfect conversion, has been comparatively small. The first of these objections has been overcome, to a certain extent, by the use of alkaline substances, notably carbonate of potash; but brewers know this to be a very imperfect remedy, as when enough of the alkaline substance was used to effect its object it has had a very injurious effect on the fermentation and yeast, preventing low attenuations, and causing the beer to become flat before it could be all drawn from the cask, besides being very unwholesome. For the second objection—that is, impairing the drawing of the mash and diminishing the yield—the only remedy has been costly—namely, slow-working presses—which expensive method is very imperfect, as the expressed extract contains a great deal of starch and other extraneous matter from the interior of the larger particles of meal, which prevents the beer becoming brilliant and causes it to sour. These difficulties have caused nearly all the many brewers who have tried cornmeal to abandon its use. By our improved process these difficulties are completely and easily overcome. Thus to obtain the necessary product, either in the form of an extract or sirup, we separate the starch, soluble albuminoids, dextrine, and salts from the cellulose, so that nearly all the oil remains in the latter, and what little oil there is in the starch, &c., is volatile, and soon passes off by boiling, so that none of the flavor peculiar to corn remains. Furthermore, the starch-cells, not being held together and protected by the cellulose and oil, and being all burst, so that the diastase comes in direct contact with every particle of starch, a perfect conversion is effected with a very small quantity of malt. The rollers C C act upon the meal, so that the insoluble portion falls from the vibrating sieve on the revolving rolls, undergoes pressure and passes to the bin below, while the liquefied starch passes from the groove formed by the upper surface of the rubber rolls through the sieve *d* at the lowest end of the hopper-shaped tank. Thus a separation is effected between the soluble and insoluble portions of the meal. It drains off as easily and quickly as an all-malt mash, is perfectly brilliant, free from all traces of starch, and of a delicate neutral flavor, thus making cornmeal a perfectly practical, good, and by far the cheapest brewing material in existence. As corn and barley are almost identical in their composition, this invention makes corn the most perfect substitute for barley-malt; also, as no chemicals or acids are used in the preparation or conversion by this process, the product is perfectly wholesome, and, being free from the oil, (which acts as a poison to the yeast,) it produces an abundant crop of light-colored, heavy, strong yeast, a very white foam on the beer, and fines quicker than beer made from malt alone.

Reference is to be had to the accompanying drawings, forming part of this specification, in which similar letters of reference indicate corresponding parts in all the figures.

Figure 1 is a vertical longitudinal section upon the line *x x* in Fig. 2 of an apparatus suitable for carrying our improved process into effect, and which, so far as most of its details are concerned, does not differ from other apparatus or devices ordinarily used for the same purpose; and Fig. 2 is a transverse section of the same on the line *y y* in Fig. 1.

To any required quantity of cornmeal in a vessel, A, add sufficient water to thoroughly saturate the meal and make it thin enough to stir. Then heat it to the boiling-point, and keep it at a fast boil for one hour or longer and constantly stirred. It is preferable to boil it with live-steam discharged directly into it, as by a perforated pipe, *b*, otherwise a portion of the meal will adhere to the sides and bottom of the vessel it is cooked in, and will be very liable to burn. If the condensed steam used in boiling does not furnish sufficient water to make the meal of a consistency of about 35° Baumé by the time the boiling is completed, then add hot water as needed to make it stir easily. After boiling one hour (more or less) cool the meal down to 150° Fahrenheit for ale and 160° Fahrenheit for lager-beer. Then add a small quantity of malt flour, and stir for thirty minutes. By this time the starchy portion of the meal, soluble albuminoids, dextrine, and salts will be sufficiently liquefied, so that most of it can be drained from the solid part of the meal through one or more vibrating sieves, B, (of forty to eighty mesh wire,) or perforated false bottom. The solid portion of the meal is then to be forced, by a pressure and movement of the hand, or otherwise, through the sieve *d*, whence it passes between revolving rollers C C, covered with elastic material, or into any suitable press, and the remaining starch, &c., pressed out, which is then to be strained through sieves of any suitable kind. The whole of the sifted starch, &c., is then to be boiled for thirty minutes, or longer, if required, to burst all the starch-cells and drive off the volatile oil. It is then to be cooled down to any proper temperature for mashing, (according to the proportions of sugar and dextrine required,) the malt added and thoroughly stirred and allowed to stand till the conversion is completed, after which we proceed the same as with a mash made with malt alone. When a very strong concentrated wort is required—as for sirup—a small quantity of malt flour may be added to the meal when it is first mixed with the water. This will keep it thinned, so that it will not be necessary to use so much water. The quantity of malt flour required to thin the starch of the meal depends on the quality of the malt it is made from. Usually from one to three per cent. is sufficient.

It will be observed that the rollers in our apparatus act on the same principle as a clothes-wringer. The insoluble portions of the meal falling from the vibrating sieve on the revolving-rolls C C are pressed between them, so that the grains will pass through the space between them into a subjacent bin, while the liquefied starch will pass from the groove formed by the roller-surfaces through the sieve *d* at the lowest end of the hopper-shaped tank, thus effecting the desired separation between the soluble and insoluble portions of the meal.

We are aware that it is not new to boil corn or rice with some malt previous to mashing for the purpose of facilitating the cooking thereof.

We are also aware that it is not new to remove the skins of the grain, but not the fine cellulose containing the starch and oil, as well as the glutinous substance formed by the high temperatures, which substances prevent the draining of the wort from the mash. The cornmeal employed by us has already had its skins removed by the ordinary bolting process.

What we claim as new and of our invention is—

1. A process of forming a mash for the manufacture of beer or sirup mainly from cornmeal, which consists in first boiling and stirring cornmeal saturated with water for about one hour, then cooling down to a temperature of 150° to 160°, adding a small quantity of malt flour and stirring for about thirty minutes, then straining off the liquid from the pressed solid matter, then boiling the strained starch, soluble albuminoids, dextrine, and salts, then cooling down to a proper mash temperature, adding malt and stirring thoroughly, and finally allowing the mash formed to stand until conversion is complete, as described.

2. An improvement in the process of preparing cornmeal for the mash, which consists in first boiling the cornmeal saturated with water, cooling it, and thinning it with a small quantity of malt, then straining and pressing the liquefied starch from the cornmeal and allowing it to cool down to a mash temperature, and finally mashing it with malt, as described.

ALFRED E. FEROE.
WILLIAM E. FEROE.

Witnesses:
HANNAH G. FEROE,
GRACE E. FEROE.